April 20, 1965
J. SWINNEY
3,179,762
ENCLOSED ELECTRICAL SWITCHGEAR WITH
PROTECTIVE HINGED ACCESS COVER
Filed Sept. 24, 1962
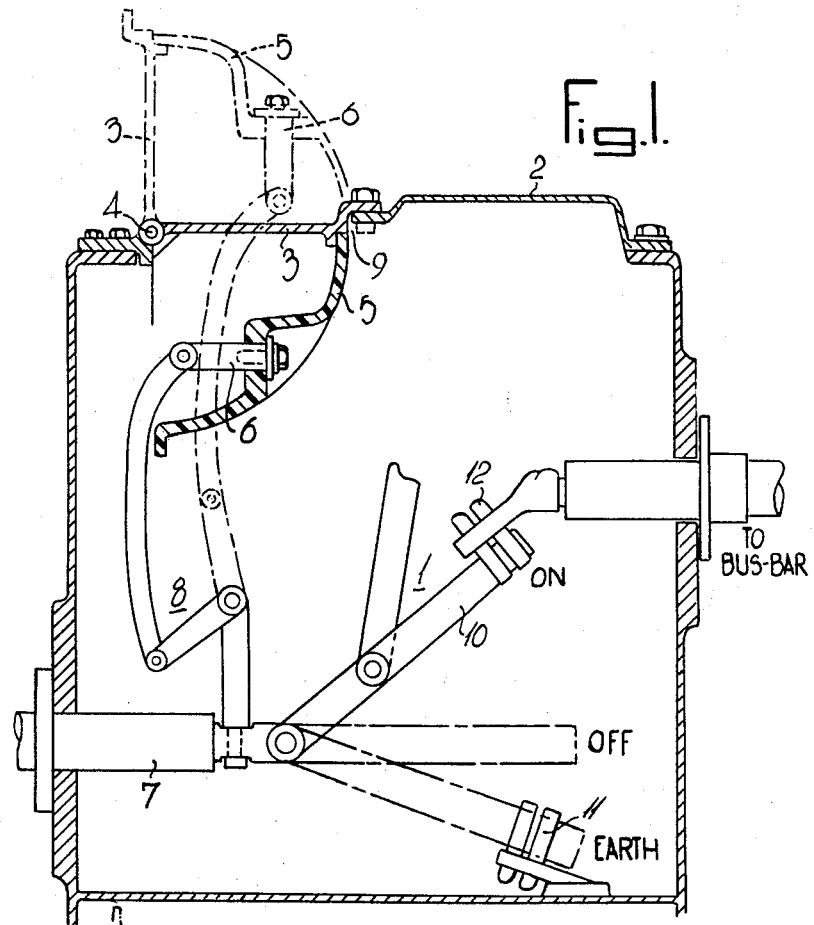
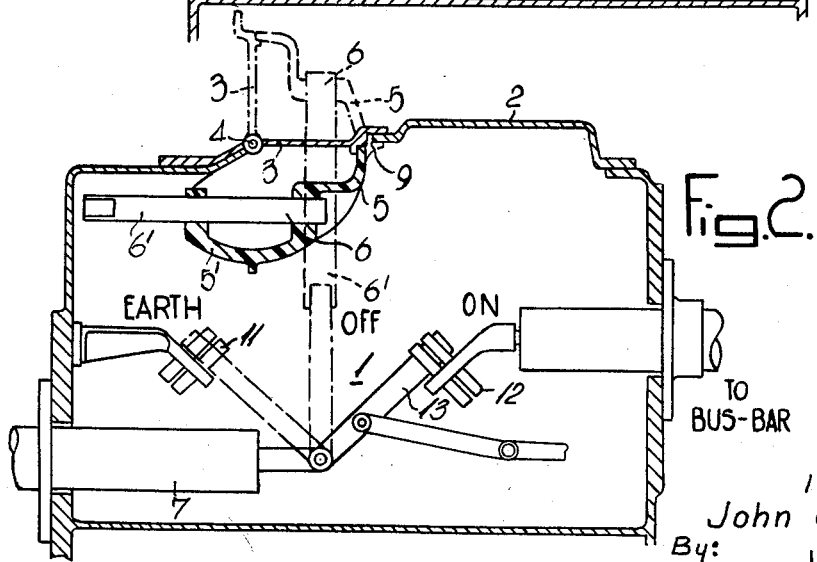
INVENTOR:
John Swinney
By:
Pillars and Bowyer
ATTORNEY 3,179,762
ENCLOSED ELECTRICAL SWITCHGEAR WITH
PROTECTIVE HINGED ACCESS COVER
John Swinney, Manchester, England, assignor to Associated Electrical Industries Limited, London, England, a British company
Filed Sept. 24, 1962, Ser. No. 225,629
Claims priority, application Great Britain, Oct. 9, 1961, 36,202/61
5 Claims. (Cl. 200—50)

This invention relates to enclosed electrical switchgear of the kind having provision for making test connections to the outgoing conductors (that is, the conductors terminating at the switchgear on the dead side) when the switching mechanism is in an off position, usually one in which the outgoing conductors are not merely disconnected from the live conductors but are positively earthed so that no standing electric charge can be present on them.

For making such test connections, test terminals may be provided. In some forms of switchgear, these are separate items which, for making connection to the outgoing conductors, possibly through the switching mechanisms, can be inserted into the enclosing casing through normally closed apertures provided for this purpose. Interlocking ensures that these apertures, which are normally closed by a hinged external cover, cannot be opened for insertion of the test terminals unless the switching mechanism is in a safe (earthing) position. Moreover a second internal cover may be provided, which can be opened only by insertion of the test terminals, thereby ensuring that only these test terminals can be fully inserted into connection with the outgoing conductors.

The present invention provides a novel and advantageous arrangement for permitting testing of the outgoing conductors of enclosed switchgear.

According to the invention a cover on which is insulatingly mounted at least one test terminal is part of the casing of enclosed switchgear and is displaceable between a first position in which said test terminal is located inaccessibly within the casing and a second position in which said test terminal is accessibly located externally of the casing, the test terminal being connected or connectible to an outgoing conductor within the casing and the cover being so formed as to maintain the casing closed in either of said positions and during movement between them.

In order that the invention may be more fully understood reference will now be made by way of example to the accompanying drawings in which, very schematically, FIGS. 1 and 2 illustrate respective embodiments of the invention.

Referring to FIG. 1, a switching mechanism 1 of a switchgear is enclosed in a metal casing 2 in which there is provided a cover 3, suitably also of metal, which is hinged at a pivot 4. This pivot 4 is located at one side of an aperture in the upper wall of the casing 2, the cover 3 enclosing this aperture. Attached to the underside of the cover 3 at the side thereof opposite its hinged side is an insulating member 5 which depends into the casing 2 when, as shown in full lines, the cover 3 is closing the aperture. This insulating member 5, which is suitably an epoxy resin casting, has a generally arcuate shape centered on the hinge axis (pivot 4) of the cover 3 so that as the cover is opened the increasing gap between the casing 2 and the side of the cover 3 away from the pivot 4 remains covered by the insulating member 5 as the latter is progressively withdrawn by the cover 3 out of the casing 2. The length of the arc of the insulating member 5 is, of course, commensurate with the angle through which the cover 3 is turned about the pivot 4 to fully open it, to the position indicated in dotted lines.

Secured in the insulating member 5 is a test terminal 6 in respect of an outgoing conductor 7 which projects through a side wall of the switchgear casing 2 and is connected to one side of the switching mechanism 1. The test terminal 6 projects through the insulating member 5 and at its end which remains within the enclosure is electrically coupled to the outgoing conductor 7 by means of an electrically conductive mechanical linkage 8 which permits free movement of the cover 3 about the pivot 4. In order that the other, outer, end of the test terminal 6 should not foul the edge 9 of the aperture in the casing 2 when the cover 3 is being opened or closed, the generally arcuate shape of the insulating member 5 is stepped as shown at the position at which the test terminal 6 is secured so that this outer end lies inside the arc travelled by the insulating member 5.

Interlocking may be provided in the switchgear in any suitable known manner (not shown) whereby the cover 3 cannot be opened to expose the test terminal 6 unless the switching mechanism 1 is in a safe position. For instance, the interlocking may prevent in known manner opening or closing of the cover 3 unless the switching mechanism 1 is in an "earth" position in which a movable conductive member 10 thereof electrically connected to the outgoing conductor 7 is in engagement with an earth terminal 11 whereby to earth the outgoing conductor 7. The interlocking may also be arranged to prevent the switching mechanism 1 being switched to an "on," or normal service position, in which the conductive member is in engagement with a busbar terminal 12, when the cover 3 is opened and the test terminal 6 thus exposed. Testing of the outgoing conductor 7 would be effected with the switching mechanism 1 in an "off" position, in which the conductive member 10 positioned intermediate the "earth" and "on" positions is not earthed so that the outgoing conductor 7 is completely isolated. A test terminal such as terminal 6 and electrically conductive mechanical linkage such as linkage 8 would be provided individually in respect of any other outgoing conductor (not shown) to which a test connection is to be made.

It will be apparent that during normal operation of the switchgear the test terminal 6 and linkage 8 are at the service potential of the outgoing conductor 7. However, adequate insulation may be provided by immersing them in oil together with the switching mechanism 1 of the switchgear.

In the embodiment illustrated in FIG. 2, in which for the sake of convenience elements having counterparts in FIG. 1 have been given the same reference numbers as their counterparts, the conductive mechanical linkage (8) electrically connecting the test terminal 6 to the outgoing conductor 7 has been omitted. Instead, for affording such electrical connection the test terminal 6 has at its inner end an extension 6' which is supported in an extension 5' of the insulating member 5 and is engageable by a movable conductive member 13 of the switching mechanism 1. This conductive member 13 corresponds to the conductive member 10 of FIG. 1 in that it is electrically connected to the outgoing conductor 7 and is operable between an "earth" position and an "on" position, but in this instance the conductive member is so disposed that in an intermediate "off" position it is in engagement with the test terminal extension 6' when the cover 3 is open. In this way connection of the test terminal 6 to the outgoing conductor 7 is effected only when testing is required and the test terminal 6 is not at the service potential of the conductor 7 during normal operation of the switchgear. Any other outgoing conductor to which a test connection is required may be catered for in similar fashion with an individual test terminal having an extension engageable with a conductive member of the switching mechanism. As before, the switching mechanism 1 may be oil immersed, although it it not now necessary to immerse the test terminal 6. Also, interlocking preventing opening of the cover 3 unless the switching mechanism is in a safe (e.g. the "earth") position would again be provided.

What I claim is:

1. Electrical switchgear comprising a casing having at least one test terminal, said casing having an opening therein, cover means secured to said casing adjacent said opening and adapted for movement from a first position to a second position, an outgoing conductor mounted in said casing, and said test terminal being secured to said cover means so that when said cover means is in its first position, said test terminal is located inaccessibly within said casing, and when said cover means is in its second position, said test terminal is accessibly located externally of the casing with said cover means forming a closure for said opening in said first and second positions and during movement between said first and second positions.

2. Electrical switchgear as claimed in claim 1, wherein said cover means comprises a casing part hinged at one side of said opening together with an insulating member attached to the inside of the casing part so as to extend into the casing and having said test terminal mounted thereon, said insulating member having a generally arcuate shape which is centered on the hinge axis of the casing part so that said insulating member serves, when the casing part is open, to maintain covered the increasing gap between the casing and the side of the casing part away from its hinge as a consequence of being progressively withdrawn by the casing part out of the casing.

3. Electrical switchgear as claimed in claim 2, wherein said test terminal projects through said insulating member and is thereby accessible externally of the casing only when the casing part is open, and wherein there is further included in said casing an electrically conductive mechanical linkage coupling the test terminal to said outgoing conductor in a manner permitting free movement of the hinged casing part between said first and second positions.

4. Electrical switchgear as claimed in claim 2, wherein said test terminal projects through said insulating member and is thereby accessible externally of the casing only when the casing part is open, and wherein there is further included in said casing a movable conductive member connected to said outgoing conductor and affording connection between said outgoing conductor and said test terminal.

5. Electrical switchgear comprising a casing adapted to be at least partially filled with oil, said casing having an opening therein, a cover hingedly secured to said casing adjacent said opening and adapted to close said opening, an insulating member secured to the underside of said cover so as to depend into said casing when said cover is in its closed position, at least one test terminal secured to said insulating member and projecting therethrough, said insulating member having a generally arcuate shape with a stepped portion through which the test terminal projects so that the terminal lies inside an arc to be traveled by the insulating member, said insulating member being secured to the edge of said cover opposite the hinged edge thereof so that as said cover is moved to its open position said insulating member forms a closure between the casing and said cover whereby the interior of said casing is constantly inaccessible and said test terminal being accessible when said cover is in its open position, an outgoing conductor secured in said casing and means for electrically coupling said outgoing conductor to said test terminal and adapted to permit free movement of the cover between said first and second positions.

References Cited by the Examiner
UNITED STATES PATENTS

| | | | |
|---|---|---|---|
| 1,324,909 | 12/19 | Krantz | 200—50 |
| 1,351,043 | 5/17 | Kries | 317—99 |
| 1,424,407 | 8/22 | Helske | 200—50 |
| 2,790,112 | 4/57 | Linde | 317—99 |
| 3,052,820 | 9/62 | Kreekon | 317—99 |

BERNARD A. GILHEANY, *Primary Examiner.*